United States Patent [19]
Thomas

[11] Patent Number: 6,046,973
[45] Date of Patent: Apr. 4, 2000

[54] INTEGRATED READ/WRITE HEAD FOR FERROELECTRIC OPTICAL MEDIA

[76] Inventor: Michael E. Thomas, 39224 Guardino Dr. #212, Fremont, Calif. 94538

[21] Appl. No.: 09/227,095

[22] Filed: Jan. 7, 1999

[51] Int. Cl.[7] .................................. G11B 9/00; G11B 7/24
[52] U.S. Cl. ........................... 369/126; 369/283; 369/288; 369/275.2; 430/270.11; 430/495
[58] Field of Search ...................................... 369/103, 288, 369/275.2, 126, 283; 365/109; 428/913; 430/435, 270.11, 270.14; 359/246, 278, 4, 6, 11, 35, 72, 245

[56] References Cited

U.S. PATENT DOCUMENTS

| | | | |
|---|---|---|---|
| 4,312,004 | 1/1982 | Samek et al. ............................. | 359/246 |
| 4,855,976 | 8/1989 | Yamazaki ................................. | 369/13 |
| 4,965,784 | 10/1990 | Land et al. ............................. | 369/275.2 |
| 5,003,528 | 3/1991 | Motes et al. ............................. | 369/110 |
| 5,051,950 | 9/1991 | Evans, Jr. et al. ....................... | 365/109 |
| 5,105,403 | 4/1992 | Kando et al. ........................... | 369/44.12 |
| 5,105,408 | 4/1992 | Lee et al. ............................. | 369/13 |
| 5,125,750 | 6/1992 | Corle et al. ............................. | 359/819 |
| 5,150,338 | 9/1992 | Birecki et al. ............................. | 369/13 |
| 5,258,860 | 11/1993 | Schehrer et al. ............................. | 359/6 |
| 5,422,873 | 6/1995 | Kewitsch et al. ......................... | 369/103 |
| 5,461,600 | 10/1995 | Pohl ......................................... | 369/112 |
| 5,598,387 | 1/1997 | Pohl ......................................... | 369/112 |
| 5,602,819 | 2/1997 | Inagaki et al. ............................. | 369/99 |
| 5,606,541 | 2/1997 | Finkelstein et al. ..................... | 369/112 |
| 5,621,559 | 4/1997 | Thakoor et al. ......................... | 359/107 |
| 5,699,175 | 12/1997 | Wilde ......................................... | 359/7 |
| 5,822,090 | 10/1998 | Wilde ..................................... | 364/103 |
| 5,976,638 | 11/1999 | Picken ................................. | 430/270.11 |

OTHER PUBLICATIONS

Architecture of TeraStor's Near Field Recording Technology, TeraStor Corp. technical info, p. 1, 1998.
Blue Lasers Extend Optical Storage to 15GB, Nikkei Electronics Asia special report, p. 1, Apr. 1998.
Alternative storage mechanisms, IBM Research, 1 page.
A.L. Kholkin, Non–Destructive Polarisation Readout by UV Illumination of Ferroelectric Thin Films, Research 96–7, 1 page.
Polar Organic And Ferroelectric Surfaces, Nonlinear Optics Laboratory Annual Report 1996, 6 pages.

*Primary Examiner*—Tan Dinh
*Assistant Examiner*—Kim-Kwok Chu

[57] ABSTRACT

An integrated read/write head structure saves and retrieves saved data stored in storage locations on a ferroelectric optical storage medium. A first ultra-violet light source generates a single beam for exciting the electrons of a ferroelectric molecule of the optical storage medium. An induced electric field transducer orients the potential difference of the ferroelectric molecule during saving data. A second ultra-violet light source generates a single beam and a MOSFET transistor detects the electric fields from a ferroelectric molecule.

3 Claims, 3 Drawing Sheets

NEGATIVE ELECTRIC FIELD

INTEGRATED READ/WRITE HEAD FOR FERROELECTRIC OPTICAL MEDIA

BACKGROUND OF THE INVENTION

Optical disk drives use laser light and a wide array of objective, polarizing, and newly invented solid immersion lens (SIL). Laser light and photon characteristics have allowed data storage peripherals to store enormous amounts of data. Sometimes the data written could only be written once, on magno-optical drives that data could be rewritten unlimited amount of times by raising the temperature of the entire track and thereby causing an erasure of data. The latest means for increasing areal densities is done by a multitude of lens arrays finally feeding into a solid immersion lens (SIL). The SIL is a truncated glass sphere which serves to increase the numerical aperture of the optical system by $n^2$, where n is the index of refraction of the lens material. A focused infrared spot is obtained at the base of the SIL head (TeraStor Inc. and Quinta Inc.), and by placing the media within a fraction of a wavelength distance from the SIL head base, this small spot can be transmitted across the small air gap. The high optical efficiency has been utilized to demonstrate the writing and reading at MHZ frequencies.

In contrast, the integrated optical head of the present invention with its newly developed ferroelectric molecule layer is able to produce a much smaller spot then SIL. The extremely high optical efficiency of this unique head will be able to write and read data in the GHZ region and up.

Ferroelectric molecular write activity is influenced by the introduction of ultra-violet or deep blue light according to Einstein/Planck theorem of Quantum Energy. An induced electrical fields further alters the ferroelectric molecular materials properties such as conductivity and electrical properties. Removal of the light source and induced electric field leave the ferroelectric molecule in an altered electrical state potential which is non-volatile. A second ultra-violet or deep blue light source and a MOSFET transistor are used to detect differences in the electrical field potential of the ferroelectric perovskovite molecule when a ultra-violet or deep blue light source is being focused on the surface of the ferroelectric perovskovite molecule.

OBJECT OF THE INVENTION

It is an object of the present invention to provide improvements in all of the above-mentioned areas, and to produce a system that uniquely out performs data storage in the state of the art as it now exists.

FIELD OF THE INVENTION

In an optical drive device for rewritable recording data by laser diode or laser light source which is integrated into the read/write head. A integrated semiconductor optical read/write head takes advantage of ultra-violet or deep blue light photon recording, increased areal densities of ferroelectric media, low cost, reliability of operation, small size, ease of manufacturability, and extremely high data transfer rates and storage capacity requirements of tomorrow's data storage devices which will be used for music, medical, video, telecommunications, and computer information storage.

This invention relates to a novel integrated semiconductor ferroelectric read/write head using a ultra-violet or deep blue light source with a metal on silicon (MOS) field effect transistor (FET) for reading data and a deep blue or ultra-violet light source write head device, and more particular, to a head device that writes and reads to a novel double sided ferroelectric perovskovite optical storage media coating on a metal, ceramic, glass or plastic type substrate for use in a rotating or linear read/write peripheral device for storing audio, video or digital information for double sided data storage. Writing is done with ultra-violet or deep blue light source and an applied electric field orientation transducer output to change the positive or negative polarization potential difference of a ferroelectric molecule in the media. Writing is done when the applied field along with the ultra-violet or deep blue light source output causes random electron movement, Einstein/Planck Theorem of Energy Quantum, the internal dipoles (remnant displacement of central atoms—remnant polarization) of the ferroelectric perovskovite molecule and the applied positive or negative electrical field is used to control the direction of electron current flow which can make the dipole displacement in the central atoms switch in the ferroelectric molecule used to store random electric field potential differences (analog voltages). The stored electric field difference (voltage) of the ferroelectric molecule is permanently changed until the ultra-violet or deep blue light source and the applied field are turned on again to reorientate the direction of the internal ferroelectric dipoles electrical field polarity. Reading is done by a second deep blue or ultra-violet light source which cause electrons of the ferroelectric perovskovite molecule dipoles to jump from one orbit to another. Niels Bohr Atom Postulates states, light excited electrons will stay in their higher energy orbits, UV or deep blue light with specific frequency and quantum energy excite the electrons of ferroelectric molecules into higher valence orbits and fall back to the normal lower energy state orbits when the UV or deep blue light source is removed. The stored internal dipole position (remnant displacement of central atoms—remnant polarization) further amplifies any higher orbit electron electrical field potential either positive or negative depending on the dipole position in the ferroelectric molecule and the distance from the UV or deep blue integrated read/write head. A MOSFET transistor that is able to detect small changes in the electrical field potential of the ferroelectric molecule when ultra-violet or deep blue light source is focused on the ferroelectric perovskovite molecule. The dipoles electrical polarity in the ferroelectric molecule can physically change the transmiscivity, opacity, diffraction, reflection, piezoelectric, electrooptic and electrical field potential parameters when illuminated by UV or deep blue light source which is characteristic of ferroelectric molecules. Extremely small laser spots of 300 angstroms and less can be written and read using integrated optical head structure with densities of up to 500 gbits/sq. in. being realized.

BRIEF DESCRIPTION OF THE DRAWINGS

The accompanying drawings, which are incorporated in and form a part of the specification, illustrate an embodiment of the invention and, together with the description, serve to explain the principles of the invention. In the drawings.

DETAILED DESCRIPTION OF THE PRESENTLY PREFERRED EMBODIMENT

Figure 1:
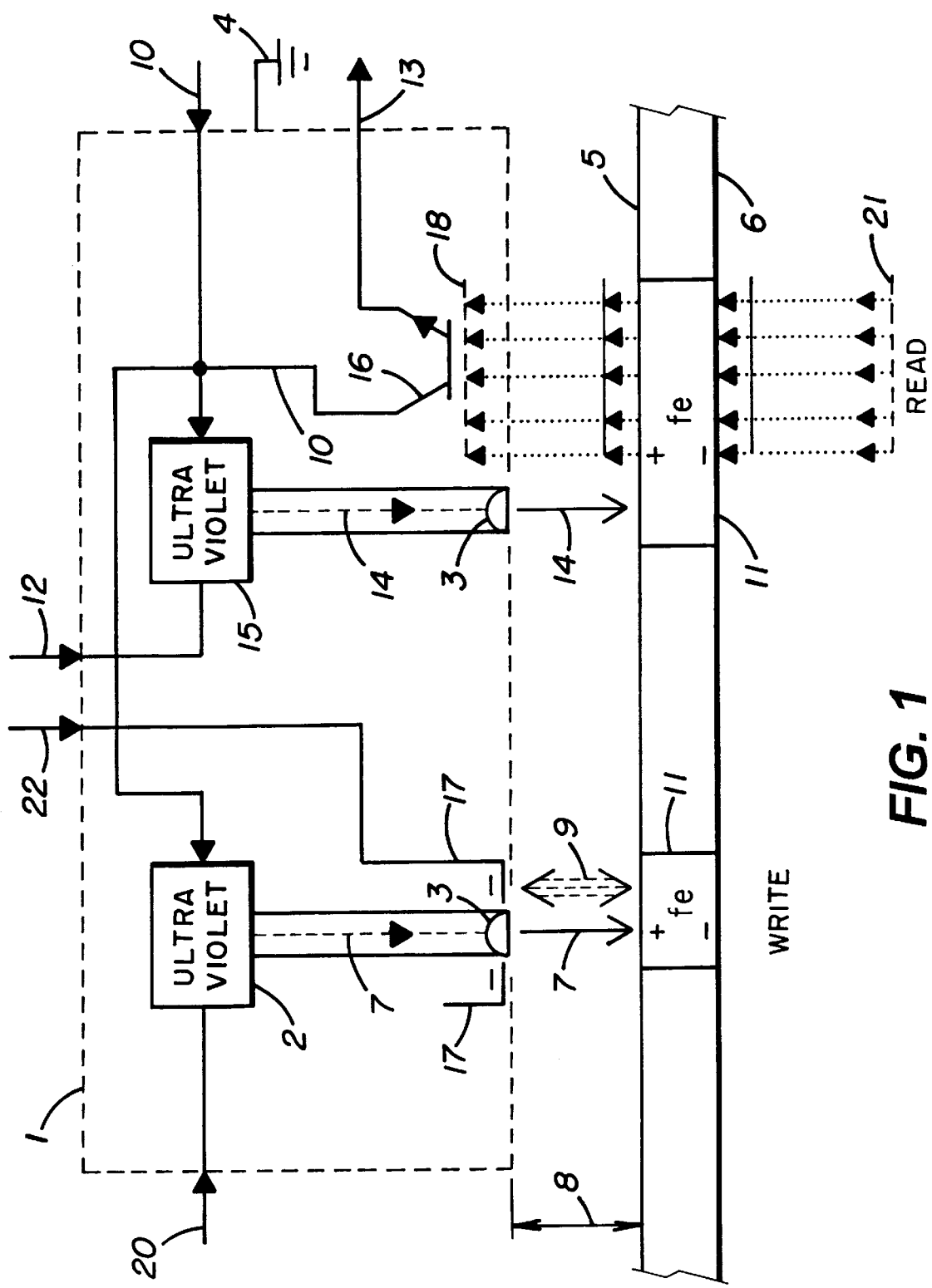
FIG. 1 is an overall block diagram of an exemplary Integrated Read/Write Head for Ferroelectric Media in accordance with the present invention.
Figure 2:
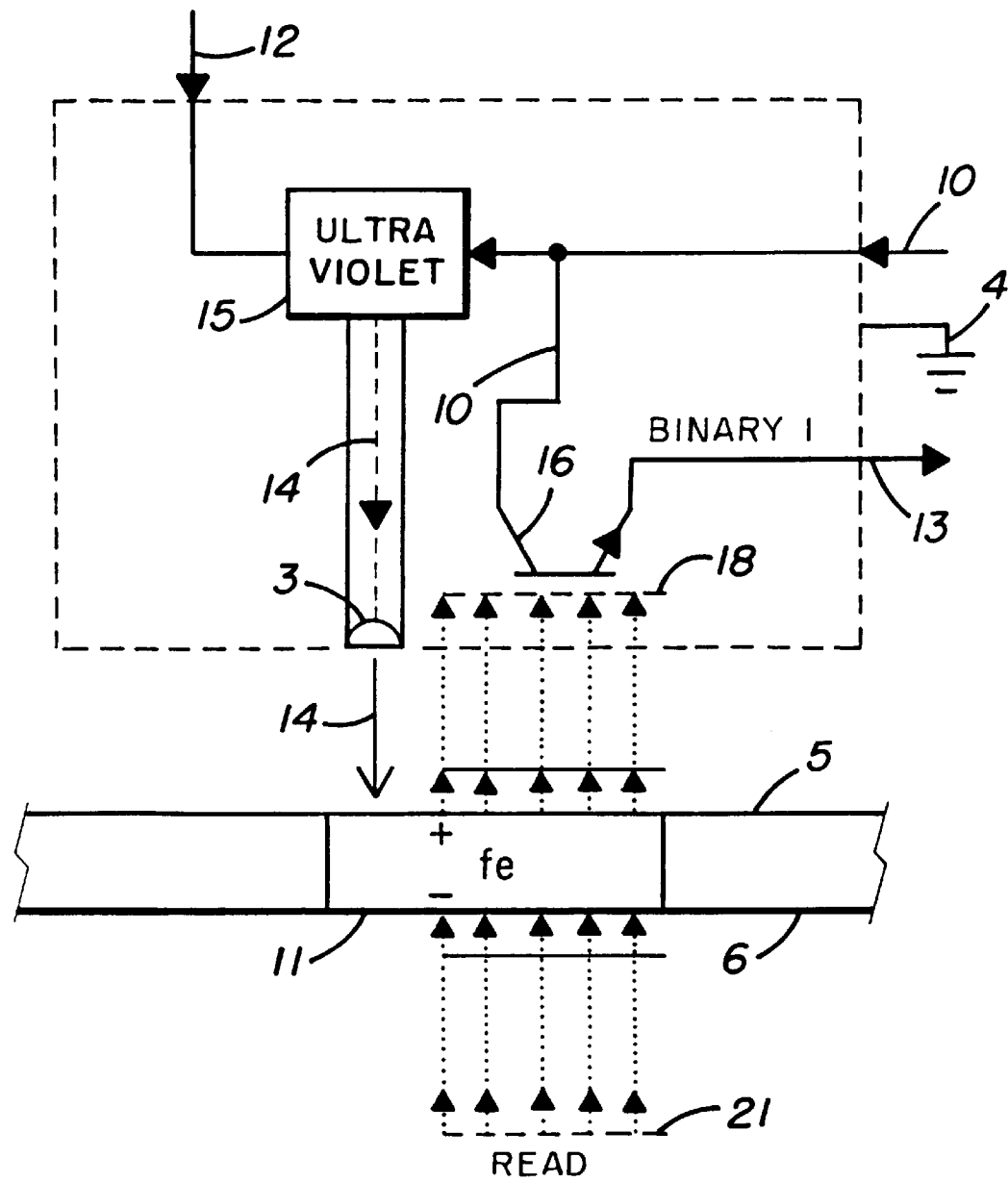
FIG. 2 is an overall block diagram of an exemplary light induced positive electric field from a ferroelectric molecule in accordance with the present invention.
Figure 3:
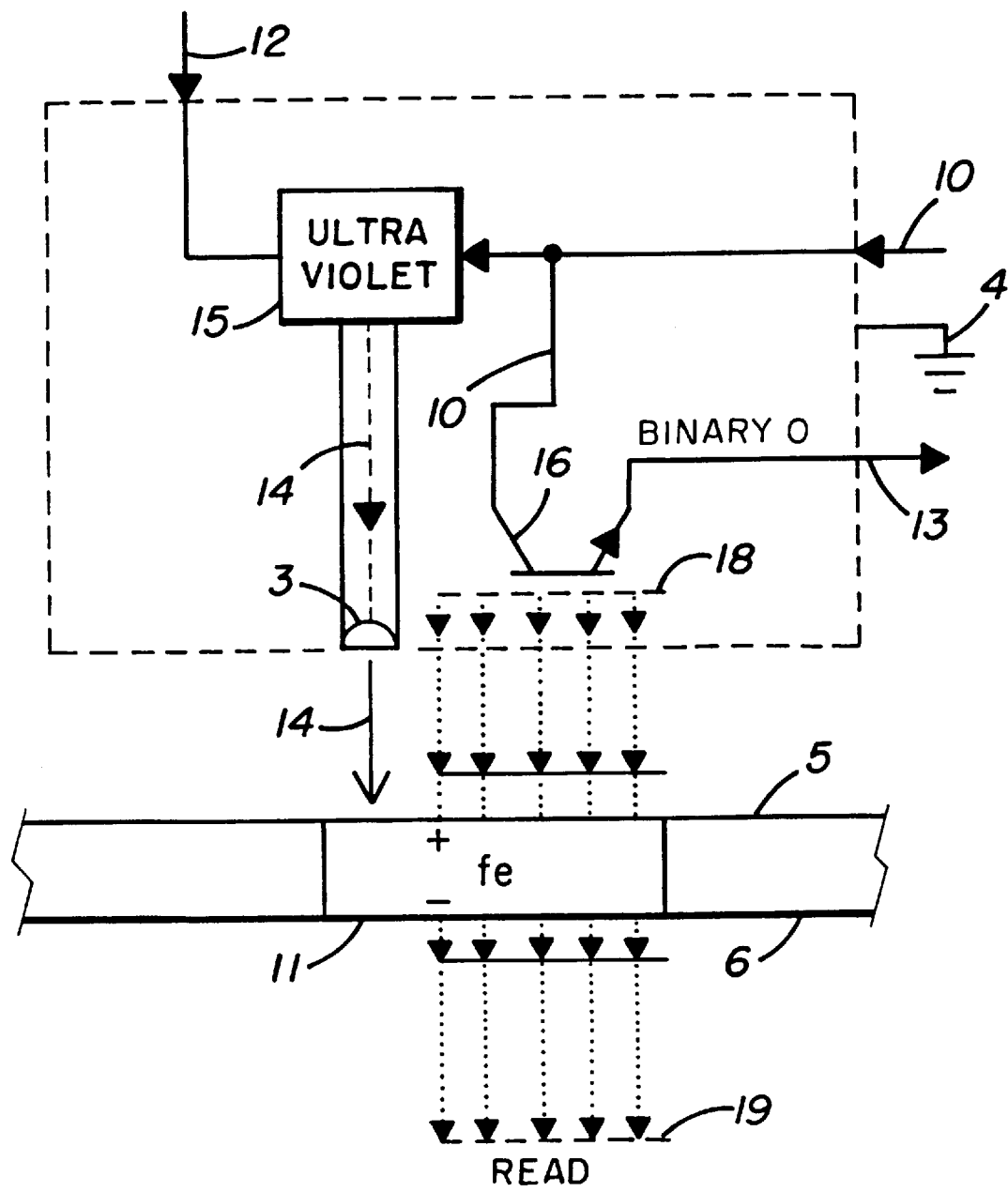
FIG. 3 is an overall block diagram of an exemplary light induced negative electric field from a ferroelectric molecule in accordance with the present invention.

FIG. 1 is a overall block diagram of a presently preferred exemplary embodiment of a integrated Read/Write Head for Ferroelectric Optical Media drive in accordance with the present invention. Referring to FIG. 1, includes write ultra-violet or deep blue light source 2, objective lens 3, flying head 1, ferroelectric surface recording medium 5, plastic substrate 6, write ultra-violet or deep blue light output 7, flying head 1 to medium 5 flying height spacing 8, electrical field transducer 17, electrical field 9, mosfet transistor 16, ferroelectric perovskovite molecule 11, read gate 12, read ultra-violet or deep blue light source 15, read data out 13, read ultra-violet light output 14, write gate 20, write data 22, positive and negative voltage inputs 10, and ground 4. Depending on the crystal structure, in some crystal lattices, the centers of the positive and negative charges do not coincide even without the application of an external electric field. In this case, it is said that there exists spontaneous polarization in the crystal. When the polarization of the molecule can be altered by an electric field, it is called ferroelectric. FIG. 2, includes light induced positive electrical field 21, normal non-induced electrical field 18. FIG. 3, includes light induced negative electrical fields 19, normal non-induced electrical field 18. Read gate 12 enables read ultra-violet or deep blue light source to transmit ultra-violet or deep blue light 14. Data is read 13 from the ferroelectric molecule 11 by the read mosfet transistor 16, light induced positive electrical field 21 has an increased positive electrical field potential when the ferroelectric molecule 11 has a positive voltage potential, in contrast, light induced negative electrical field 19 has a decreased negative electrical field potential when the ferroelectric molecule has a negative voltage potential. The light induced electrical fields positive 21 and negative 19 can be made to represent data equal to binary one and 0 at the output of mosfet transistor 16 data 13, and normal non-induced electrical fields 18 never strike mosfet transistor 16. Write gate signal 20 turns on write ultra-violet light source 2. Write data signal 22 controls the voltage polarity of electric field transducer 17 which generates a negative or positive electrical field 9 used to polarize the ferroelectric perovskovite molecule 11. Ultra-violet or deep blue light 7 generate free electrons in the ferroelectric molecule due to the Einstein/Planck Quantum Theory which are used by the electric field 9 of transducer 17 to induce electron movement, i.e. electric current, in the ferroelectric perovskovite crystal. The electrical field 9 polarity potential will remain with the ferroelectric molecule after write ultra-violet or deep blue light source 2 and transducer 17 are both turned off. Objective lens 3 is used to refine the ultra-violet or deep blue light 7. Non-contact distance 8 separates flying head 1 from ferroelectric medium 5 and substrate 6.

Although only a few presently preferred exemplary embodiments have been discussed in detail above, those of ordinary skill in the art will certainly realize that many modifications are possible without departing from the scope and spirit of the present invention as defined in the following.

What I claim is:

1. An integrated non-contact read/write head structure for saving and retrieving saved data stored in storage locations on a ferroelectric optical storage medium, comprising:

(A) a first ultra-violet or deep blue light source for generating a single beam for exciting the electrons of a ferroelectric molecule of said optical storage medium, an induced electric field transducer for orientating the potential difference of the ferroelectric molecule during saving data, (A) a second ultra-violet or deep blue light source for generating a single beam, and a MOSFET transistor for detecting the electric fields from a ferroelectric molecule.

2. An integrated read/write head structure of claim 1, wherein said ultra-violet or deep blue light source electric field transducer, and MOSFET transistor are integrated on a common semiconductor structure.

3. The integrated read/write head structure of claim 1, wherein said read/write head is used in a rotating disk or linear storage device.

* * * * *